United States Patent

[15] 3,635,505

Osterhagen et al.

[45] Jan. 18, 1972

[54] PLUG CONNECTION FOR PIPES WITH EXTERNAL HELICALLY SHAPED RIBS, BEADS, OR THE LIKE

[72] Inventors: Gerhard Osterhagen, Driesch; Friedhelm Krebsbach, Siegburg; Waldemar Wissinger, Siegburg, all of Germany

[73] Assignee: Dynamit Nobel AG, Troisdorf, Germany

[22] Filed: Oct. 29, 1969

[21] Appl. No.: 872,287

[30] Foreign Application Priority Data

Nov. 9, 1968 Germany.....................P 18 08 056.3

[52] U.S. Cl..................................285/345, 85/46, 277/167, 285/355, 285/379
[51] Int. Cl.........................................F16l 17/00
[58] Field of Search..................285/230, 231, 345, 347, 355, 285/379, 390; 277/203, 207, DIG. 2, DIG. 3, 167; 85/46

[56] References Cited

UNITED STATES PATENTS

| 1,767,164 | 6/1930 | Ahern et al............................277/167 |
| 1,819,890 | 8/1931 | Gleason..................................277/203 |
| 2,271,931 | 2/1942 | Williamson et al. ................285/355 X |

Primary Examiner—Dave W. Arola
Attorney—Craig, Antonelli & Hill

[57] ABSTRACT

A plug connection for pipe with ribs, beads or the like, formed on the outside of a pipe member in a single-thread or multiple-thread fashion, with at least one annular sealing element disposed between the inserted pipe end and the overlapping pipe end or socket. The sealing element has a right-angled stepped shoulder having a dimension corresponding to the pitch. The stepped shoulder of the sealing element passes through a number of ribs corresponding to the number of threads. The ribs can be provided with grooves for the insertion of the sealing element; the sealing element can have a hollow cross section as well as having a shape, as viewed in cross section, of a semicircular external surface or a triangle with the tip thereof pointing outwardly.

46 Claims, 15 Drawing Figures

INVENTORS
GERHARD OSTERHAGEN
FRIEDHELM KREBSBACH
WALDEMAR WISSINGER

BY

ATTORNEYS

INVENTORS
GERHARD OSTERHAGEN
FRIEDHELM KREBSBACH
WALDEMAR WISSINGER

BY
Craig, Antonelli, Stewart & Hill

ATTORNEYS

3,635,505

PLUG CONNECTION FOR PIPES WITH EXTERNAL HELICALLY SHAPED RIBS, BEADS, OR THE LIKE

BACKGROUND OF THE INVENTION

The present invention relates to a plug connection for pipes with ribs, beads, or the like formed on the outside thereof in a single-thread or multiple-thread fashion, and more particularly, to a plug connection with at least one annular sealing element disposed between the plugged-in pipe end and the overlapping pipe end or an overlapping socket.

In known couplings for pipes which are smooth on the outside, one or more annular sealing elements are disposed either in a corresponding number of grooves of the fitted-in pipe end or of the pipe end, or of a socket, extending thereover. These couplings cannot be employed without special and complicated measures in connection with pipes having external ribs, beads, or the like extending in a helical shape, as are present, in particular, in so-called wound pipes, that is, in the case of pipes which are wound from a profiled strip, the rims of which can mutually interengage, or so that they can be welded, cemented, or the like. Such special measures would include, for example, the machining of the external ribs of the pipe end to be inserted as well as the formation of a groove for receiving the sealing element at the pipe end to be inserted or at the section of the other pipe extending thereover.

SUMMARY OF THE INVENTION

It is the aim of the present invention to provide a plug connection of the aforementioned type, which overcomes the above-mentioned disadvantages in a simple and economical manner.

The underlying problems are solved in accordance with the present invention by providing a plug connection with a sealing element having a preferably right-angled stepped shoulder, corresponding in its dimension to the thread by means of which the sealing element is passed through a number of ribs corresponding to the number of threads. In the case of a double- or multiple-thread external rib formation, the stepped shoulder, just as in case of single-thread ribs, can be provided at a single point along the circumference of the sealing element. However, it is also possible to form the shoulder at several points distributed along the circumference, but the number of points corresponds, at most, to the number of threads, that is, is no larger than the number of threads.

Apart from the provision of relatively small rib perforations having a width which corresponds approximately to the width of the sealing element, no further measures are necessary. In particular, complicated milling operations for obtaining a smooth socket end by machining the ribs in this pipe zone are thereby eliminated.

Likewise, it is advantageous that the strength of the pipe end, which is based to a substantial extent on the presence of the ribs extending therearound, remains practically completely preserved.

It is also advantageous that the interval between adjacent ribs presents itself readily as a groove for the insertion of the sealing element, or represents such a groove, so that no additional steps for forming such a groove are required.

Although the stepped shoulder passing through the ribs perforce results in fixing the sealing element against displacement in the circumferential direction, the present invention provides that, especially for the case of using very soft and flexible sealing elements, the ribs are formed with grooves extending in the longitudinal extension of the ribs. The sealing element engages these grooves, so that an additional locking action is present not only in the circumferential direction, but also in any desired other direction.

In place thereof or also in conjunction therewith, a shaped or contoured supporting member can be arranged between the sealing element contacting a rib on one side and the subsequent winding of the rib, which supporting member bridges the interval. In such a case, under certain circumstances, the shaped supporting member, rather than the sealing element, engages the groove of the rib. Moreover, the shaped supporting member can also be attached to the pipe in some other manner such as, for example, by cementing.

Of course, it is also possible to dispose ribs of identical or different cross section in a double-thread arrangement at such a spacing that the sealing element is in contact therewith on both sides and is thus unequivocally fixed in the direction of the pipe axis.

Especially when using sealing elements of a soft or resilient material, it is advantageous to provide the shaped supporting member with laterally projecting lugs or the like, to support the stepped shoulder against compressive load or stress. These lugs engage the rib perforations and, accordingly, are not only fixedly positioned themselves in the circumferential direction, but also impart a hold or rigidity to the stepped shoulder.

A variety of cross-sectional configurations are possible for the sealing element. Particularly suitable and especially advantageous is a cross-sectional shape with a fluted or grooved inner surface so that several successive chambers are formed with respect to the direction of the pipe axis, which chambers, on the one hand, ensure a satisfactory sealing effect and, on the other hand, prevent a so-called "drifting" of the seal. In this connection, the provision can be made, according to a further suggestion of the invention, to select the cross-sectional configuration so that the external surface, as seen in cross section, extends in a semicircle, and the cross section itself approximately corresponds to an isosceles triangle or an equilateral triangle.

The foregoing ensures, on one hand, an advantageous characteristic with respect to radial compression or stress and, on the other hand, a secure arrangement with respect to shifting and rotational displacement of the sealing element. In order to increase the elasticity, the further provision can be made to construct the sealing element with a hollow cross section.

A further possibility of rigidifying the sealing element in the zone of the stepped shoulder against compressive stress also resides in fashioning the sealing element to be widened in this zone. In addition thereto or in place thereof, the sealing element can be provided with reinforcing inserts and/or supporting bodies having a rigidifying effect in the peripheral direction. The supporting bodies are optionally attached to the pipe.

BRIEF DESCRIPTION OF THE DRAWINGS

These and further features, aims and objects will become more apparent from the following description when taken in connection with the accompanying drawings which show, for purposes of illustration only, several embodiments of the present invention and wherein.

DETAILED DESCRIPTION OF THE DRAWINGS

Figure 1:
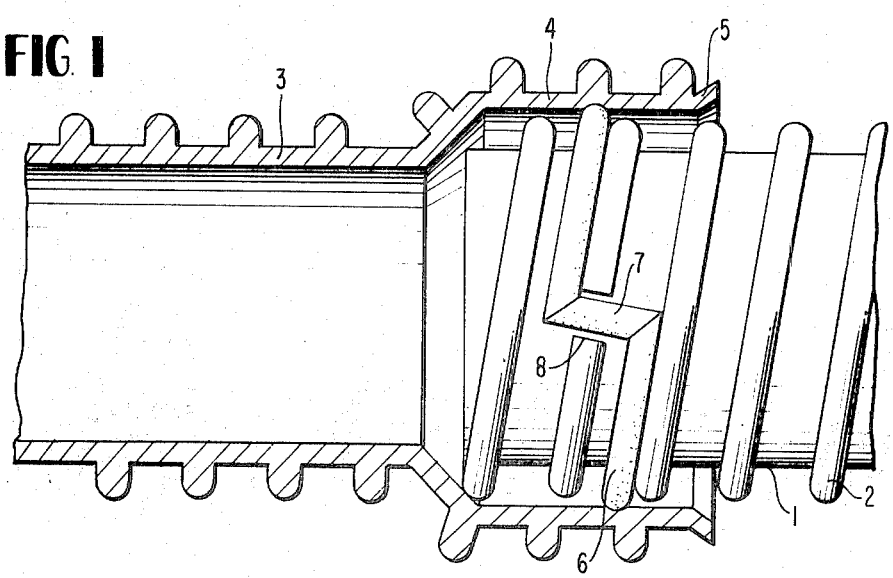
FIG. 1 is a partial sectional view of a plug connection between pipes having single-thread ribs.

Referring now to the drawings and, in particular, to FIG. 1, the end of the pipe 1, which is provided on its outer surface with the helically extending ribs 2 provided in single-thread arrangement, is inserted in the end of an identically constructed pipe 3, which has an end that is widened into a socket 4 with a conical extension 5. An annular sealing element 6 is inserted between the pipe 1 and the socket 4 and is provided with an approximately right-angled stepped shoulder 7. By means of the shoulder 7, the sealing element 6 extends through the interruptions 8 of one of the ribs so that the sealing element 6 contacts one of the ribs along the entire circumference of the pipe. The outer diameter of the sealing element 6 has a larger dimension than the inner diameter of the socket 4 so that the intended sealing effect is provided by a more or less strong compression of the sealing element with simultaneous elastic deformation thereof. By means of the shoulder 7, the sealing element 6 is fixed in the circumferential direction and is thus prevented from any undesired drifting.

Figure 2:
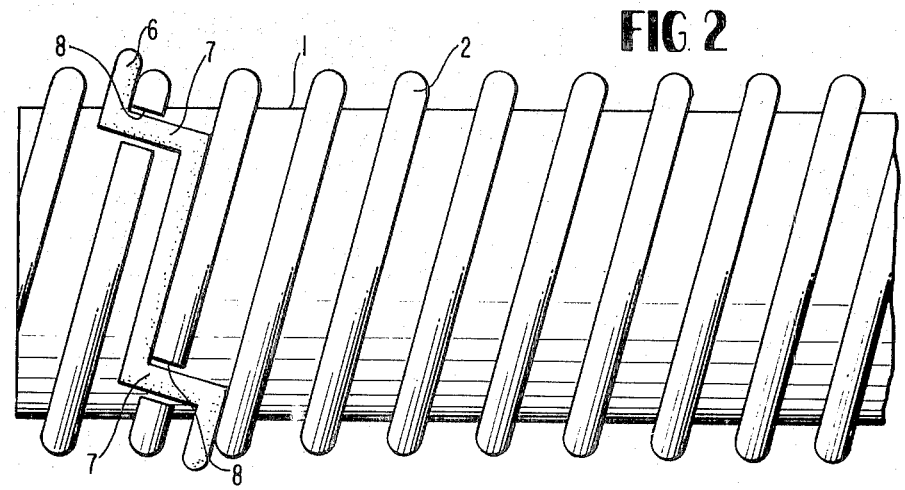
FIG. 2 shows a pipe having double-thread ribs with a sealing element.

In the pipe shown in FIG. 2, the ribs 2 are in a double-thread arrangement. Correspondingly, the stepped shoulder 7 of the sealing element 6 is passed through two ribs 2. In this connection, the shoulder 7 is divided into two sections distributed over the pipe circumference, and thus the adjacent windings of the ribs 2 are provided with the perforations 8 at different points.

Figure 3:
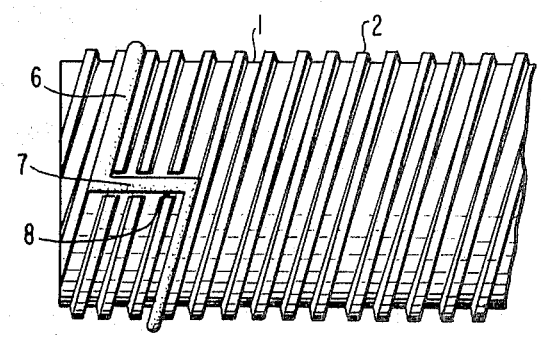
FIG. 3 shows a pipe having ribs in a triple-thread arrangement with a sealing element.

The pipe 1 shown in FIG. 3 is provided with ribs 2, which have a somewhat different cross-sectional configuration and are in a triple-thread arrangement. By means of the stepped shoulder 7 the sealing element 6 extends on one and the same point of the pipe circumference, through three adjacent ribs 2. It is, of course, also possible in the pipe shown in FIG. 3 to distribute the stepped shoulder 7 over two or also over three points distributed along the circumference in a manner similar to that of FIG. 2.

Figure 4:
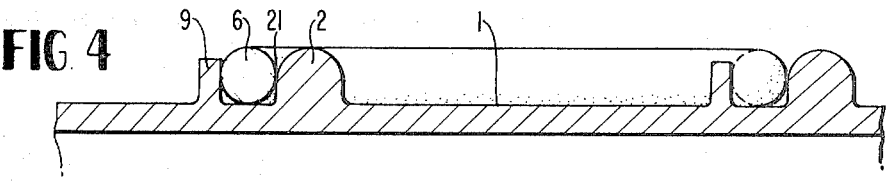
FIG. 4 is a partial sectional view of a pipe having double-thread ribs with a sealing element.

According to FIG. 4, the wall of the pipe 1 is provided in a double-thread arrangement with reinforcing ribs 2 and also with supporting ribs 9 extending at a spacing to ribs 2 corresponding to the width of the sealing element 6. In chamber 21 formed by the space between the ribs 2 and 9, the sealing element 6 is inserted and thus fixedly retained in the direction of the pipe axis (not shown).

Figure 5:
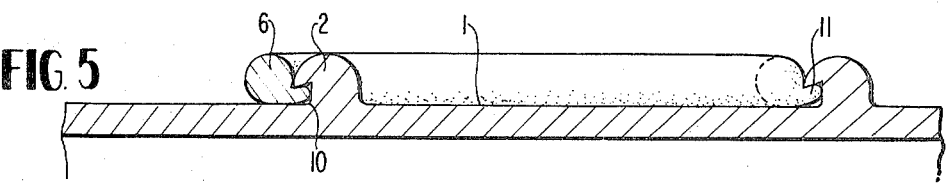
FIG. 5 shows, in the manner similar to FIG. 4, a pipe with a sealing element engaging a groove of the ribs.

In the embodiment shown in FIG. 5, supporting rib 9 is omitted, and, in place thereof, rib 2 is provided with groove 10. The correspondingly shaped sealing element 6 engages this groove with lug 11 and is thereby held or fixed in position.

Figure 6:
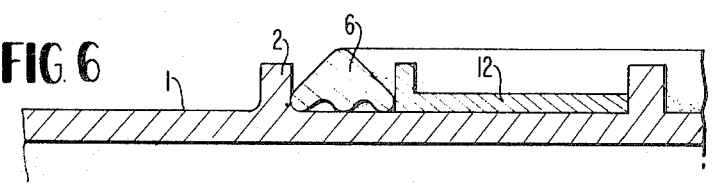
FIG. 6 shows a sealing element fixedly disposed between adjacent ribs by means of a shaped supporting member.

According to FIG. 6, the sealing element 6 inserted between ribs 2 is fixed in the direction of the pipe axis by means of the shaped supporting member 12.

Figure 7:
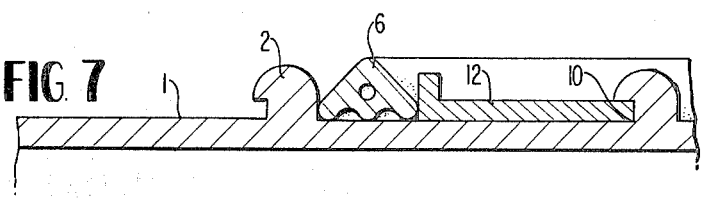
FIG. 7 shows the mounting of the shaped supporting member in a groove of the ribs.

FIG. 7 is a modification similar to FIG. 6, wherein ribs 2, which have a different cross-sectional shape, are provided with the lateral groove 10 in a manner similar to that of FIG. 5 with supporting member 12 fittingly engaging this groove. In this embodiment, as well as in that of FIG. 6, the shaped supporting member 12 is dimensioned so that, considering the radial compression of the sealing element 6, the axial fixed positioning is attained in the desired manner.

Figure 8:
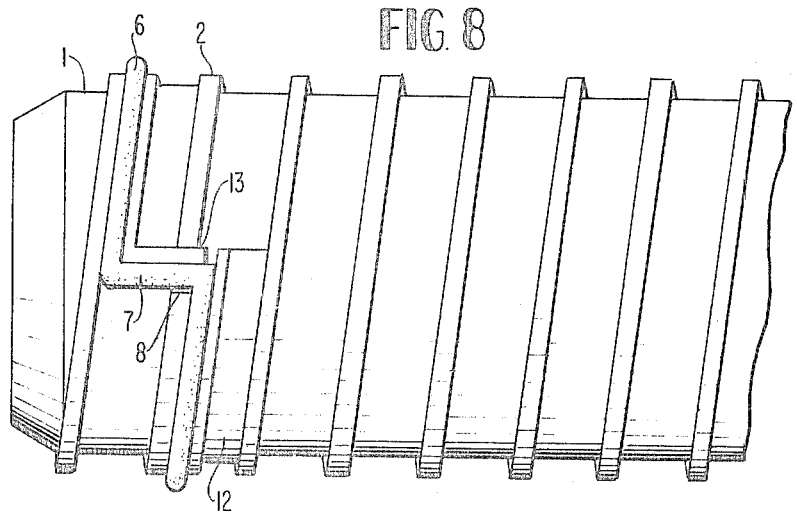
FIG. 8 is a top view of a single-thread ribbed pipe with a sealing element and a supporting member.

In accordance with FIG. 8, the lateral edge of the supporting member 12 inserted between sealing element 6 and rib 2 is extended on one end at right angles to the longitudinal extension and projects laterally in the form of lug 13. By means of the lug 13, the shaped supporting member 12 engages the rib perforation 8, which results in locking of the supporting member in the circumferential direction, as well as simultaneously in a support of the shoulder 7 against internal pressure.

Figure 9:
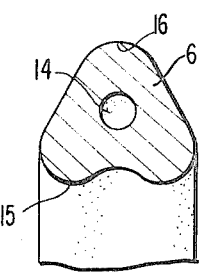
FIGS. 9–11 show three different cross-sectional configurations for the sealing element.
Figure 10:
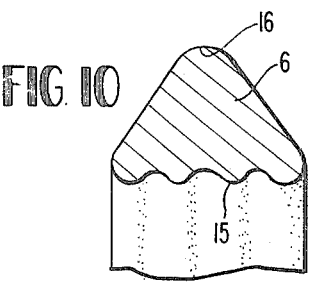
Figure 11:
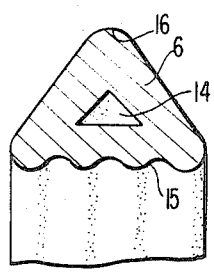

FIGS. 9–11 illustrate sealing elements 6 fashioned with a substantially triangular cross section. The profile of FIG. 9 is provided with cavity 14 and rests with two beads 15 on the outer surface of the pipe (not shown). Four such beads are respectively provided in the profiles of FIG. 10 and 11. FIG. 11 is provided with cavity 14, as distinguished from the solid cross section of FIG. 10. These profiles exhibit the essential advantage of having a relatively broad contact surface on the pipe, which safely prevents any undesired drifting or shifting. On the other hand, the externally disposed rounded tip 16 of the triangular cross section has the result that the sealing element possesses a very good elasticity and can very accurately adapt itself, in particular with its externally positioned tip, to the inner surface of the overlapping part. However, many additional other cross-sectional configurations of any type are, of course, possible for the sealing element.

Figure 13:
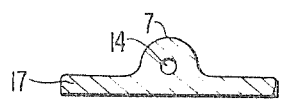
FIG. 13 is a sectional view along line A–B of FIG. 12.
Figure 12:
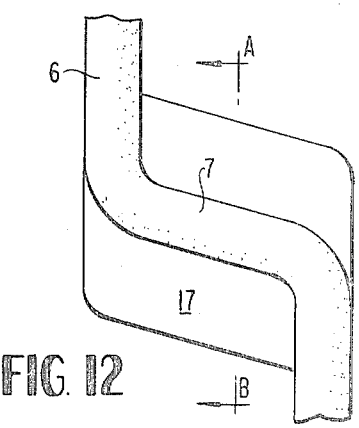
FIG. 12 shows a partial view of the contour of a sealing element widened in the zone of the stepped shoulder.
Figure 15:
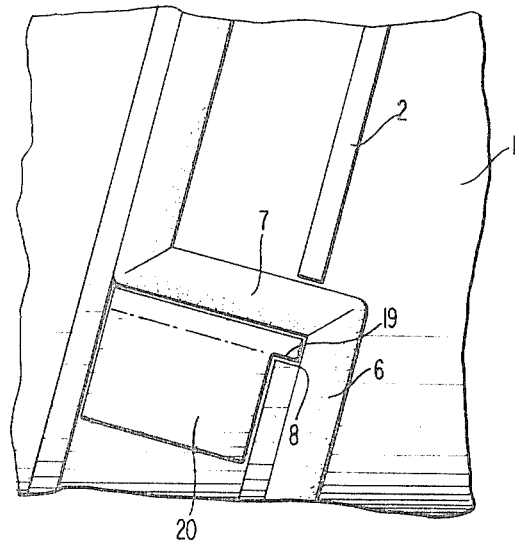
FIG. 15 shows a further type of affixing or supporting of the sealing element.

According to FIGS. 12 and 13, shoulder 7 of the sealing element 6 is widened by means of flanges 17 in its lower part resting on the pipe, so that shoulder 7 is rigidified in the circumferential direction and thus is strengthened against any internal pressure. In this instance, the cross-sectional shape of the sealing element is, of course, optional. In particular, it is also possible to provide the configurations shown in FIGS. 9–11 in conjunction with the flanges 17.

Figure 14:
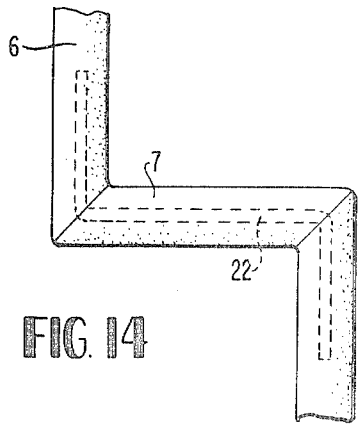
FIG. 14 shows the stepped shoulder of a sealing arrangement provided with a reinforcing insert.

In place of the widened portions 17, the stepped shoulder 7 in the sealing element 6 of FIG. 14 is strengthened by means of the reinforcement 22 embedded therein. The reinforcement is made, for example, of steel.

FIG. 5 illustrates another type of reinforcing and supporting of the stepped shoulder 7 of the sealing element 6. The element 20 is locked in the rib perforation 8 by means of the lug 19 and is fittingly inserted between two adjacent ribs. The thickness of element 20 can correspond to the height of the ribs or it can be lesser. As indicated by the dot-dash line, a web corresponding to the height of the ribs 2 can be provided in an extension of the lug 19. In this case, the remaining part of the element can have a smaller thickness.

While we have shown and described several embodiments in accordance with the present invention, it is understood that the same if not limited thereto, but is susceptible of numerous changes and modifications within the spirit and scope of the present invention and we, therefore, do not wish to be limited to the details shown and described herein but intend to cover all such changes and modifications as are encompassed by the scope of the appended claims.

We claim:

1. Plug connection for coupling male and female members having substantially helically shaped riblike portions formed on the outside thereof in at least a single-thread manner, comprising at least one closed annular sealing element disposed on said male member between the engaging male and female members, the sealing element having a substantially right-angled stepped shoulder with a dimension corresponding at least to the pitch of said rib like portions and passing through an interruption in at least one of the riblike portions, so as to surround said male member without interruption, the outer periphery of said sealing element contacting said female member along the entire length thereof.

2. Plug connection according to claim 1, wherein the male member is an inserted pipe end.

3. Plug connection according to claim 2, wherein the female member is an overlapping pipe end.

4. Plug connection according to claim 2, wherein the female member is an overlapping socket.

5. Plug connection according to claim 1, wherein the riblike portions are provided with groove means extending longitudinally therealong.

6. Plug connection according to claim 5, wherein the male member is an inserted pipe end and the female member is an overlapping pipe end.

7. Plug connection according to claim 1, wherein a shaped supporting member is arranged between the sealing element and the riblike portions for the fixed positioning of the sealing element whereby the shaped supporting member extends in the direction of the riblike portions.

8. Plug connection according to claim 7, wherein the male member is an inserted pipe end and the female member is an overlapping socket.

9. Plug connection according to claim 8, wherein the riblike portions are provided with groove means extending longitudinally therealong.

10. Plug connection according to claim 9, wherein the shaped supporting member is operatively connected at the outer surface of the pipe by the groove means adapted to receive the shaped supporting member.

11. Plug connection according to claim 7, wherein the shaped supporting member is operatively connected at the outer surface of a member by bonding means.

12. Plug connection according to claim 7, wherein the shaped supporting member is provided with at least one lateral projection for fixedly positioning the shaped supporting member in the zone of the interruptions of the riblike portions, and the male member is an inserted pipe end while the female member is an overlapping pipe end.

13. Plug connection according to claim 12, wherein the shaped supporting member is operatively connected at the outer surface of the pipe by the groove means adapted to receive the shaped supporting member.

14. Plug connection according to claim 12, wherein the shaped supporting member is operatively connected at the outer surface of the pipe by bonding means.

15. Plug connection according to claim 1, wherein the inner surface of the sealing element is provided with at least two beadlike portions, and the male member is an inserted pipe end while the female member is an overlapping pipe end.

16. Plug connection according to claim 15, wherein the riblike portions are provided with groove means extending longitudinally therealong.

17. Plug connection according to claim 16, wherein a shaped supporting member is arranged between the sealing element and the riblike portions for the fixed positioning of the sealing element whereby the shaped supporting element extends in the direction of the riblike portions.

18. Plug connection according to claim 17, wherein the shaped supporting member is operatively connected at the outer surface of the pipe by the groove means adapted to receive the shaped supporting member.

19. Plug connection according to claim 17, wherein the supporting member is operatively connected at the outer surface of the pipe by bonding means.

20. Plug connection according to claim 18, wherein the shaped supporting member is provided with at least one lateral projection for fixedly positioning the shaped supporting member in the zone of the interruptions of the riblike portions.

21. Plug connection according to claim 1, wherein the outer surface of the sealing element, as viewed in cross section, is of substantially semicircular configuration, and the male member is an inserted pipe end while the female member is an overlapping socket.

22. Plug connection according to claim 21, wherein the riblike portions are provided with groove means extending longitudinally therealong, and a shaped supporting member is arranged between the sealing element and the riblike portions for the fixed positioning of the sealing element, whereby the shaped supporting element extends in the direction of the riblike portions.

23. Plug connection according to claim 22, wherein the shaped supporting member is operatively connected at the outer surface of the pipe by the groove means adapted to receive the shaped supporting member.

24. Plug connection according to claim 23, wherein the shaped supporting member is provided with at least one lateral projection for fixedly positioning the supporting member in the zone of the interruptions of the riblike portions.

25. Plug connection according to claim 3, wherein the sealing element has substantially a shape, as viewed in cross section, of a triangle with the apex thereof pointing outwardly.

26. Plug connection according to claim 25, wherein the triangular shape is substantially an isosceles triangle.

27. Plug connection according to claim 25, wherein the triangular shape is substantially an equilateral triangle.

28. Plug connection according to claim 25, wherein the riblike portions are provided with groove means extending longitudinally therealong.

29. Plug connection according to claim 28, wherein a shaped supporting member is arranged between the sealing element and the riblike portions for the fixed positioning of the sealing element, whereby the shaped supporting member extends in the direction of the riblike portions.

30. Plug connection according to claim 29, wherein the shaped supporting member is operatively connected at the outer surface of the pipe by bonding means.

31. Plug connection according to claim 30, wherein the shaped supporting member is provided with at least one lateral projection for fixedly positioning the supporting member in the zone of the interruptions of the riblike portions, and the inner surface of the sealing element is provided with at least two beadlike portions.

32. Plug connection according to claim 3, wherein the sealing element is provided with a bore, whereby the sealing element has a hollow cross section.

33. Plug connection according to claim 32, wherein the riblike portions are provided with groove means extending longitudinally therealong, a shaped supporting member is arranged between the sealing element and the riblike portions for the fixed positioning of the sealing element and the riblike portions for the fixed positioning of the sealing element with the supporting member extending in the direction of the riblike portions, the shaped supporting member being operatively connected at the outer surface of the pipe by the groove means adapted to receive the supporting member, and the shaped supporting member is provided with at least one lateral projection for fixedly positioning the shaped supporting member in the zone of the interruptions of the riblike portions.

34. Plug connection according to claim 33, wherein the inner surface of the sealing element is provided with at least two beadlike portions.

35. Plug connection according to claim 34, wherein the outer surface of the sealing element as viewed in cross section, is of substantially semicircular configuration.

36. Plug connection according to claim 34, wherein the sealing element has substantially the shape, as viewed in cross section, of a triangle with the apex thereof pointing outwardly.

37. Plug connection according to claim 3, wherein the sealing element is widened in the zone of the stepped shoulder.

38. Plug connection according to claim 37, wherein the riblike portions are provided with groove means extending longitudinally therealong, and a shaped supporting member is arranged between the sealing element and the riblike portions for the fixed positioning of the sealing element with the shaped supporting member extending in the direction of the riblike portion.

39. Plug connection according to claim 38, wherein the shaped supporting member is operatively connected at the outer surface of the pipe by the groove means adapted to receive the shaped supporting member, the shaped supporting member being further provided with at least one lateral projection for fixedly positioning the shaped supporting member in the zone of the interruptions of the riblike portions.

40. Plug connection according to claim 39, wherein the inner surface of the sealing element is provided with at least two beadlike portions, and the outer surface of the sealing element, as viewed in cross section is of substantially semicircular configuration.

41. Plug connection according to claim 39, wherein the inner surface of the sealing element is provided with at least two beadlike portions, and the sealing element has substantially the shape, as viewed in cross section, of a triangle with the apex thereof pointing outwardly.

42. Plug connection according to claim 40, wherein the sealing element is widened in the zone of the stepped shoulders.

43. Plug connection according to claim 3, wherein support means is provided on the pipe for supporting the sealing element in the circumferential direction of the pipe in the zone of the stepped shoulder.

44. Plug connection according to claim 43, wherein the riblike portions are provided with groove means extending longitudinally therealong, and the shaped supporting member is arranged between the sealing element and the riblike portions for the fixed positioning of the sealing element with the shaped supporting member extending in the direction of the riblike portions.

45. Plug connection according to claim 44, wherein the inner surface of the sealing element is provided with at least two beadlike portions, and the outer surface of the sealing element, as viewed in cross section, is of substantially semicircular configuration.

46. Plug connection according to claim 44, wherein the inner surface of the sealing element is provided with at least two beadlike portions, and the sealing element has substantially the shape, as viewed in cross section, of a triangle with the apex thereof pointing outwardly.

* * * * *